(12) United States Patent
Holzleitner et al.

(10) Patent No.: US 8,884,212 B2
(45) Date of Patent: Nov. 11, 2014

(54) NEUTRON MULTIPLICITY COUNTING

(76) Inventors: Ludwig Holzleitner, Stutensee (DE); Martyn T. Swinhoe, Los Alamos, NM (US)

(*) Notice: Subject to any disclaimer, the term of this patent is extended or adjusted under 35 U.S.C. 154(b) by 319 days.

(21) Appl. No.: 13/394,598

(22) PCT Filed: Jul. 9, 2010

(86) PCT No.: PCT/EP2010/059905
§ 371 (c)(1),
(2), (4) Date: Oct. 19, 2012

(87) PCT Pub. No.: WO2011/032743
PCT Pub. Date: Mar. 24, 2011

(65) Prior Publication Data
US 2013/0043379 A1    Feb. 21, 2013

(30) Foreign Application Priority Data

Sep. 18, 2009   (EP) .................................... 09170727

(51) Int. Cl.
*G01D 18/00*   (2006.01)
*G01T 3/00*    (2006.01)

(52) U.S. Cl.
CPC ........................................ *G01T 3/00* (2013.01)
USPC ........................................................ 250/252.1

(58) Field of Classification Search
USPC ........................................................... 250/252.1
See application file for complete search history.

(56) References Cited

U.S. PATENT DOCUMENTS 6,333,958 B1    12/2001  Stewart
8,044,366 B2 *  10/2011  Croft et al. ............... 250/390.01

(Continued)

FOREIGN PATENT DOCUMENTS

EP    1707992 A1   10/2006
GB     960548 A     6/1964

OTHER PUBLICATIONS

N. Ensslin et al., "Passive Non-Destructive Assay of Nuclear Materials", NUREG/CR-5550 LA-UR-90-732, pp. 457-488.

(Continued)

*Primary Examiner* — Kiho Kim
*Assistant Examiner* — Taeho Jo
(74) *Attorney, Agent, or Firm* — Ryan Barrett Kennedy

(57) ABSTRACT

Each pulse of a pulse sequence received from a neutron detector is set as a trigger pulse triggering a predefined gate, the multiplicity of pulses within this gate is determined, the pulse having triggered the gate is assigned to a multiplicity category corresponding to this multiplicity of pulses and the trigger-to-predecessor distances from the trigger pulse to pulses preceding the trigger pulse within a certain range in the pulse sequence are determined. The range within which one looks for predecessor pulses of each trigger pulse exceeds the dead time of the neutron detector. For each multiplicity category, the number of trigger pulses assigned thereto is determined. For each multiplicity category, one builds, based upon the trigger-to-predecessor intervals determined, a distribution in time after an arbitrary preceding pulse of trigger pulses assigned to that specific multiplicity category. Based upon the multiplicity-specific distribution, one estimates, for each multiplicity category, the number of trigger pulses lost due to neutron detector dead time that would have been assigned to the multiplicity category. When the estimated number of lost trigger pulses is known, the number of trigger pulses assigned to each multiplicity category is accordingly corrected. As trigger pulses could have been assigned to a wrong multiplicity category due to missing pulses inside the triggered gates, the number of trigger pulses assigned to each multiplicity category may additionally be corrected for that using a similar technique.

12 Claims, 5 Drawing Sheets

(56) References Cited

U.S. PATENT DOCUMENTS

| 8,155,258 | B2* | 4/2012 | Rowland et al. | 376/156 |
| 2006/0146977 | A1 | 7/2006 | Rowland | |
| 2010/0215138 | A1* | 8/2010 | Rowland et al. | 376/254 |
| 2010/0332145 | A1* | 12/2010 | Rowland et al. | 702/22 |

OTHER PUBLICATIONS

International Search Report PCT/EP2010/059905; International Filing Date Nov. 19, 2010; Mailing Date Nov. 26, 2010, 2 pages.

Harper Ensslin, et al., "Application Guide to Multiplicity Counting" Manual, LA-13422-M, 1998, p. 1-121.

N. Dytlewski et al., Measurement variances in thermal neutron coincidence counting, Nuclear Instr. Methods, A327, pp. 469-479, 1993.

Bill Harker, et al., "INCC Software Users Manual", LA-UR-01-6761, Sep. 2003, p. 1-100, http://lib-www.lanl.gov/la-pubs/00326587.pdf.

R. Kuramoto, et al., "Rossi-α Experiment in the IPEN/MB-01 Research Reactor" Brazilian Journal of Physics, vol. 35, No. 3B, Sep. 2005. p. 751-753.

* cited by examiner

NEUTRON MULTIPLICITY COUNTING

TECHNICAL FIELD

The present invention generally relates to a neutron counting, in particular a neutron multiplicity counting method.

BRIEF DESCRIPTION OF RELATED ART

Neutron multiplicity counting is a technique used for non-destructively assaying the quantity of fissile material such as, e.g. uranium (U), plutonium (Pu), californium (Cf), etc. Neutron multiplicity counting is based upon the fact that neutrons from spontaneous or induced fission events are emitted substantially simultaneously. The probabilities of having a 0, 1, 3, etc. neutrons in a fission event (sometimes called the multiplicity distribution) provides a signature of the material under examination.

Neutron multiplicity counting may be considered as a generalization of neutron coincidence counting, which looks for pairs of neutrons that are close together in time, to triples, quadruples and higher order multiples of neutrons. Typically, a neutron detector outputs a train of pulses, each of which represents one detected neutron. The distribution of the pulses in time or the distribution of the time intervals between the pulses, whichever is more convenient, is caused by an a priori unknown combination of spontaneous fission, induced fission ($\alpha$,n)-reactions and external events. Whereas fission events yield multiple neutrons that are coincident in time, ($\alpha$,n)-reactions and external events produce neutrons that are randomly distributed in time.

A neutron detector typically comprises a body of polyethylene having a cavity in the middle to accommodate a sample during measurement. Around the cavity, gas proportional counters, often $^3$He tubes, are embedded in the polyethylene body. If a neutron is emitted from the sample, there is a high probability that it will collide with hydrogen in the polyethylene. Neutrons thus lose energy until thermal equilibrium with the material is reached. A fraction of these thermalised neutrons eventually hit an atom of the gas in one of the gas proportionality counters. If a neutron hits a gas atom, a charge is released and collected at the electrode of the tube. The gas proportional counters are connected to preamplifiers, which receive the electric pulses from the gas proportional counters, process them and output them as a pulse train for further processing. Neutron detection can also be carried out using scintillation counters. It should be noted that the invention described herein can be applied neutron counting in general, irrespective of the physical principle used to detect the neutrons and convert the detection events into a pulse train.

The time along a pulse train is continuous but in the following we will consider pulse trains as a sequence of discrete time intervals of uniform duration, called TICs. Each of these time intervals may be empty or contain a pulse. Depending on the instrument used, the pulse train may be provided on a single channel (the output of all preamplifiers being summed on this channel) or on a plurality of synchronized channels. The time along a pulse train is in principle continuous. The analyzing electronics is working with a certain clock speed (usually given in MHz), cutting this continuous time in a sequence of discrete time intervals of uniform duration (the duration determined by the clock speed), in the following called TICs. The analyzing electronics can only recognize whether there is a pulse within such a time interval on a given channel or not, in case there are more pulses within the same TIC on the same channel, only one pulse is recognized there by the electronics. This justifies to consider the pulse train as a sequence of discrete time intervals, each TIC for each cannel containing one pulse or no pulse, even if the time along the pulse train in continuous. The loss of pulse recognition from the fact, that there may be more than one pulse within the same TIC at the same channel, is neglected.

The analysis of a pulse train from a neutron detector (i.e. the distribution of pulses in time) is complex because neutron detectors have a detection efficiency of less than 1 (meaning that only a fraction of the neutrons from a sample is actually detected), many of the apparent coincidences are due to accidental overlaps (of background events, background and fission events or fission events) and neutrons stemming from a single event are not necessarily recorded at the same time (or with a fixed delay between them). It should be noted that the detection efficiency affects not only the overall count rate but also has a much higher impact on the detection of bursts of neutrons (i.e. pairs, triplets, etc. of neutrons from a common fission event). In other words, the observed pulse train from a neutron detector contains many "accidental" but relatively few "real" coincident events.

To study the pulse train from a neutron source, the Rossi-$\alpha$ distribution has proved its usefulness (see e.g. "Passive Non-Destructive Assay of Nuclear Materials" by Reilly, Ensslin and Smith, NUREG/CR-5550 LA-UR-90-732, pp. 457-488). The Rossi-$\alpha$ distribution is the distribution in time of events that follow after an arbitrary starting event. The Rossi-$\alpha$ distribution may be obtained by fixing an arbitrary pulse from the pulse train as the starting pulse and recording each subsequent pulse in a bin corresponding to the distance from the starting pulse to the subsequent pulse (up to a predetermined maximum distance). (The terms "distance" and "interval" are used herein to designate the length of a time interval and are conveniently expressed in units of TICs.) Then, the next pulse of the pulse train is fixed as the starting pulse and the process is iterated. Each bin of the distribution thus indicates the count of pulses occurring at a particular distance from a starting pulse. If the pulse train contains only random events, the corresponding Rossi-$\alpha$ distribution is constant with time. If, however, real coincidence events are present, the Rossi-$\alpha$ distribution may be written as:

$$RoAl(t) = A + R \cdot e^{-t/\tau}, \quad \text{(Eqn. 1)}$$

where RoAl(t) is the height of the distribution at distance t from the starting pulse, A is the number of accidental coincidences, R is the number of real coincidences and T is the so-called die-away time of the detector.

However, a Rossi-$\alpha$ distribution that has been an experimentally determined as described above will be perturbed for short distances from the starting pulse. (That is to say, equation 1 holds only for distances exceeding a certain minimum distance.) This is well known and caused by the so-called "dead time effect". After detection of a neutron, a proportional counter tube needs some time to recover (usually about 1 µs). In the meanwhile, this counter tube cannot generate a further pulse, even if another neutron is captured therein. Similarly, the electronics of the preamplifier need some recovery time after treating a pulse from a counter tube. Due to the recovery time, there is a reduced probability of recording a pulse within a few TICs from a leading pulse. The "dead time" designates the time during which pulses may get lost due to this effect and during which the true coincidence count rate cannot be measured. Each neutron detector has its characteristic dead time. Those skilled in the art are aware that the dead time effect is particularly detrimental to the detection of correlated events because these involve neutrons that are close together in time.

In conventional neutron multiplicity counting, one determines, for a given pulse of the pulse train, the multiplicity (i.e. the number) of pulses within a first and a second gate (time window) triggered by the given pulse. The first gate (the "reals-plus-accidentals gate" or "R+A gate") is positioned shortly after the triggering pulse whereas the second gate (the "accidentals gate" or "A gate") is positioned a long delay (typically 1 to 4 ms) after that pulse. Doing this for all pulses of the pulse train, one obtains a distribution of multiplicities or "multiplicity vector" for the R+A gate and another such distribution or vector for the A gate. The R+A multiplicity distribution or vector indicates how many times in the pulse train each multiplicity was determined in the R+A gate. Similarly, the A multiplicity distribution or vector indicates how many times in the pulse train each multiplicity was determined in the A gate. The long delay between each trigger pulse and the A gate is chosen to amount to many times the neutron lifetime in the detector, so that there is no residual correlation between the trigger pulse and the pulses in the corresponding A gate. Accordingly, the distribution of correlated events corresponds to the difference between the R+A multiplicity distribution and the A multiplicity distribution. In the most widespread method, R+A and A multiplicity distributions are used to calculate the "singles" (total count rate), the "doubles" (number of correlated pulse pairs in the pulse train), "triples" (number of sets of three correlated pulses in the pulse train) and higher order "moments". A good overview of the multiplicity counting technique is given in "Application Guide to Multiplicity Counting" by Ensslin, Harper, Krick, Langner, Pickrell and Steward, LA-13422-M, 1998.

As mentioned hereinbefore, the dead time effect falsifies the number of pulses during the first TICs after each trigger pulse. These lost pulses have an impact on the multiplicity distributions determined. To reduce their impact, the R+A gate is normally not opened immediately after the triggering pulse but only after a short time interval (the so-called "pre-delay"). Nevertheless, when the singles, doubles, triples, etc. are calculated from the multiplicity distributions, corrections to account of the dead time are still necessary. Different dead time correction methods are currently used. The most popular one comprise semi-empirical correction for the singles and the doubles and a method by Dytlewski (N. Dytlewski et al., "Measurement variances in thermal neutron coincidence counting," Nuclear Instr. Methods, A327, pp. 469-479, 1993) for the triples (see e.g. Harker and Krick: "INCC Software Users Manual", LA-UR-01-6761, September 2003). These corrections require dedicated calibration measurements to determine certain correction parameters. In general, these methods are adequate for counting rates less than 1 MHz if the desired measurement accuracy is in the few percent range. Other correction methods have had little in-field use because of the complexity of their formulation.

BRIEF SUMMARY

The problems encountered with the correction of dead time impact currently limit the practical use of neutron multiplicity counting to the third order, i.e. to singles, doubles and triples. The use of "quadruples" or "quads" (number of sets of four correlated pulses in the pulse train) has not been much pursued, among other reasons because of the lack of a corresponding dead time correction.

It follows from the above that there is a need in the neutron detection community for an efficient dead time correction method. Advantageously, such dead time correction should be based upon the collected data themselves, in order to reduce the workload in relation to detector characterization and calibration at the beginning of each measurement or after a change in detector configuration has occurred.

Accordingly the invention provides an improved neutron counting method, in particular in respect to the above-mentioned problem with dead time correction.

The proposed neutron counting method starts with receiving a pulse sequence (e.g. a part of the pulse train) from a neutron detector. It should be noted that the pulse sequence may be provided on the fly, i.e. with the pulses coming in as soon as a neutron has been detected by the neutron detector, or as a data file containing the pulse sequence from the neutron detector stored previously.

Each pulse of the pulse sequence is set as a trigger pulse triggering a predefined gate (e.g. a "reals-plus-accidentals" gate or an "accidentals" gate), the multiplicity of pulses (i.e. the number of pulses) within this gate is determined, the pulse having triggered the gate is assigned to a multiplicity category corresponding to this multiplicity of pulses and the trigger-to-predecessor distances from the trigger pulse to pulses preceding the trigger pulse within a certain range in the pulse sequence are determined. The range within which one looks for predecessor pulses of each trigger pulse exceeds the dead time of the neutron detector.

For each multiplicity category, the number of trigger pulses assigned thereto is determined; this yields the classical multiplicity distribution or multiplicity vector for the predefined gate under consideration.

Furthermore, for each multiplicity category, one builds, based upon the trigger-to-predecessor intervals determined, a distribution in time after an arbitrary preceding pulse of trigger pulses assigned to that specific multiplicity category. This distribution may be regarded as a kind of Rossi-$\alpha$ distribution of trigger pulses assigned to a particular multiplicity category. It should be noted that each of these multiplicity-specific distributions might be split into a plurality of "sub-distributions" (e.g. according to the channels on which the trigger pulses are received). Due to the symmetry of distance measurement, the distribution in time after an arbitrary preceding pulse of trigger pulses assigned to that specific multiplicity category is advantageously computed by fixing a pulse as the current trigger pulse, recording the distances from this trigger pulse to its predecessors in corresponding distance bins, then setting the next pulse in the sequence as the current trigger pulse and iterating the process.

Based upon the multiplicity-specific distribution, one estimates, for each multiplicity category, the number of trigger pulses lost due to neutron detector dead time that would have been assigned to the multiplicity category. A simple way of doing this would be to conjecture a theoretical distribution in time after an arbitrary preceding pulse of trigger pulses assigned to that multiplicity category and to derive the number of lost trigger pulses from the discrepancy between the actual and the theoretical distributions. More preferred ways to determine the number of lost trigger pulses for each multiplicity category are explained in more detail hereinafter.

When the estimated number of lost trigger pulses is known, the number of trigger pulses assigned to each multiplicity category is accordingly corrected.

According to a preferred embodiment of the invention, the pulse sequence is received on at least two neutron detector channels. It is assumed that the presence of a pulse on one of the channels results in a dead time after that pulse only in the same channel. According to the present embodiment, one builds, for each multiplicity category, the distribution in time after an arbitrary preceding pulse of trigger pulses assigned to that multiplicity category as a first sub-distribution and a second sub-distribution. The first sub-distribution is a distribution in time after an arbitrary preceding pulse of trigger pulses assigned to the multiplicity category that have been received on the same of the at least two channels as the preceding pulse. The second sub-distribution is a distribution in time after an arbitrary preceding pulse of trigger pulses assigned to the multiplicity category that have been received on another of the at least two channels as the preceding pulse. It should be noted that the sum of the first and second sub-distributions corresponds to a distribution in time after an arbitrary preceding pulse of trigger pulses assigned to the multiplicity category under consideration received on any of the at least two channels. It is thus possible to build the latter distribution (first sum sub-distribution) directly and to build the second sub-distribution by subtracting the first sub-distribution from the first sum sub-distribution.

One may then estimate the number of lost trigger pulses in each multiplicity category based upon the difference between the corresponding first and the second sub-distributions. For each multiplicity category, this may be done by computing the sum of the first and second sub-distributions (i.e. the first sum sub-distribution) and scaling the second sub-distribution in such a way that it fits to the sum of the first and second sub-distributions. A distribution in time after an arbitrary preceding pulse of lost trigger pulses may then be calculated based upon the difference between the scaled second sub-distribution and the sum of the first and second sub-distributions; integrating this distribution of lost trigger pulses over time then yields the estimate of the number of lost trigger pulses.

According to an even more preferred variant of the invention, each multiplicity-specific distribution in time after an arbitrary preceding pulse of the trigger pulses is subdivided into a plurality of sub-distributions according to the channels on which the trigger pulses have been received. In other words, one also takes into account the channel on which each trigger pulse has been received. This variant has the advantage that the number of lost trigger pulses can be individually corrected for each channel. Summation over all channels then yields the estimate total number of lost trigger pulses.

When the multiplicity- and channel-specific sub-distributions are built, one preferably takes into account again whether a trigger pulse has been received on the same or a different channel than the preceding pulse: for each multiplicity category and for each channel one thus may build
 a first sub-distribution, the first sub-distribution being a distribution in time after an arbitrary preceding pulse of trigger pulses, received on the channel under consideration, assigned to the multiplicity category under consideration and received on the same of the at least two channels as the arbitrary preceding pulse; and
 a second sub-distribution, the second sub-distribution being a distribution in time after an arbitrary preceding pulse of trigger pulses, received on the channel under consideration, assigned to the multiplicity category under consideration and received on another of the at least two channels as the arbitrary preceding pulse.

The sum of the (channel-specific) first and second sub-distributions corresponds to a distribution in time after an arbitrary preceding pulse, received on any of the at least two channels, of trigger pulses assigned to the multiplicity category under consideration and received on the channel under consideration. It is thus possible to build the latter distribution (channel-specific first sum sub-distribution) directly and to build the channel-specific second sub-distribution by subtracting the channel-specific first sub-distribution from the channel-specific first sum sub-distribution.

Using the first and second sub-distributions, one may compute a channel-specific distribution in time after an arbitrary preceding pulse of lost trigger pulses by scaling the second channel-specific sub-distribution so that it fits to the sum of the channel-specific first and second sub-distributions (i.e. the first channel-specific sum sub-distribution) and computing the difference between the scaled second sub-distribution and the channel-specific sum of the first and second sub-distributions. The estimate number of lost trigger pulses may be computed by summing over all channels and integrating over time the channel-specific distributions in time after an arbitrary preceding pulse of lost trigger pulses.

The method as exposed so far provides for correcting the number of trigger pulses assigned to each multiplicity category by an estimate of the lost trigger pulses in the corresponding category. Those skilled will note, however, that lost pulses within the gates may have caused trigger pulses to be wrongly assigned to their multiplicity category. To address this issue, the neutron counting method preferably comprises steps, in which the number of trigger pulses wrongly assigned to each multiplicity category is estimated and the number of trigger pulses assigned to each multiplicity category is accordingly corrected.

To carry out this additional correction, one preferably determines, for each pulse of the pulse sequence, when set as trigger pulse, and for each pulse within the gate triggered by that trigger pulse, pulse-to-predecessor intervals from the pulse in the gate to pulses preceding it within a certain range (preferably equal to the range mentioned above). For each multiplicity category, one may now build, based upon the pulse-to-predecessor intervals determined, a distribution in time after an arbitrary preceding pulse of pulses situated in any gate triggered by a trigger pulse assigned to the multiplicity category under consideration. This distribution may also be regarded as a kind of Rossi-α distribution and it should be noted that this distribution might be split into a plurality of "sub-distributions". This distribution serves to estimate the number of trigger pulses wrongly assigned to the multiplicity category due to pulses lost within the gates triggered by them. A simple way of carrying out this estimation would be to conjecture a corresponding theoretical distribution and to derive the number of wrongly assigned trigger pulses from the discrepancy between the actual and the theoretical distributions.

If the pulse sequence is received on at least two channels, for each multiplicity category the building of the (multiplicity-specific) distribution in time after an arbitrary preceding pulse of pulses situated in any gate triggered by a trigger pulse assigned to the multiplicity category may comprise:
 building a third sub-distribution, the third sub-distribution being a distribution in time after an arbitrary preceding pulse of pulses situated in any gate triggered by a trigger pulse assigned to the multiplicity category and received on the same of the at least two channels as the preceding pulse;
 building a fourth sub-distribution, the fourth sub-distribution being a distribution in time after an arbitrary preceding pulse of pulses situated in any gate triggered by a trigger pulse assigned to the multiplicity category and received on another one of the at least two channels as the preceding pulse.

The sum of the third and fourth sub-distributions corresponds to a distribution in time after an arbitrary preceding pulse of pulses situated in any gate triggered by a trigger pulse assigned to the multiplicity category under consideration and received on any of said at least two channels. It is thus possible to build the latter distribution (second sum sub-distribution) directly and to compute the second sub-distribution by subtracting the third sub-distribution from the second sum sub-distribution.

Estimating the number of trigger pulses wrongly assigned to the multiplicity category due to lost pulses within the gates triggered by them then advantageously comprises:

scaling the fourth sub-distribution so that it fits to the sum of the third and fourth sub-distributions (i.e. the second sum sub-distribution), computing a distribution in time after an arbitrary preceding pulse of trigger pulses wrongly assigned to a multiplicity category lower than the multiplicity category under consideration due to lost pulses within the gates triggered by them based upon a difference of the scaled second sub-distribution and the sum of the first and second sub-distributions, integrating over time the distribution in time after an arbitrary preceding pulse of trigger pulses wrongly assigned to a multiplicity category lower than the multiplicity category under consideration due to lost pulses within the gates triggered by them; and withdrawing from the integrated distribution the corresponding integrated distribution of the next higher multiplicity category.

The step last mentioned reflects that the correction for trigger pulses that have been wrongly assigned to their multiplicity category should not change the total number of trigger pulses (in contrast to the correction for lost trigger pulses). Indeed, if a pulse has been lost within a given gate, this causes the trigger pulse of that gate to be wrongly assigned to a lower than the correct multiplicity category—this wrongly assigned trigger pulse thus causes the number of pulses in the lower multiplicity category to be one unit higher whereas the number of pulses in the higher multiplicity category (which the trigger pulse failed to be assigned to) is by one unit lower than it should be. Accordingly, the distribution of the trigger pulses among the multiplicity categories needs to be corrected without this implying a change in the total number of assigned trigger pulses.

Preferably, each multiplicity-specific distribution in time after an arbitrary preceding pulse of pulses situated in any gate triggered by a trigger pulse assigned to the multiplicity category is subdivided into a plurality of sub-distributions according to the channels on which the trigger pulses have been received. When the multiplicity- and channel-specific sub-distributions are built, one preferably takes into account again whether a trigger pulse has been received on the same or a different channel than the preceding pulse: for each multiplicity category and for each channel one thus may build a third sub-distribution, the third sub-distribution being a distribution in time after an arbitrary preceding pulse of pulses situated in any gate triggered by a trigger pulse assigned to the multiplicity category and received on the same of the at least two channels as the preceding pulse;

a fourth sub-distribution, the fourth sub-distribution being a distribution in time after an arbitrary preceding pulse of pulses situated in any gate triggered by a trigger pulse assigned to the multiplicity category and received on another one of the at least two channels as the preceding pulse.

The sum of the (channel-specific) third and fourth sub-distributions corresponds to a distribution in time after an arbitrary preceding pulse of pulses received on any of said at least two channels and situated in any gate triggered by a trigger pulse, where the trigger pulse is assigned to the multiplicity category under consideration and received on the channel under consideration. It is thus possible to build the latter distribution (channel-specific second sum sub-distribution) directly and to compute the channel-specific second sub-distribution by subtracting the channel-specific third sub-distribution from the channel-specific second sum sub-distribution.

To estimating the number of trigger pulses wrongly assigned to each multiplicity category, one may proceed by scaling, for each channel, the fourth sub-distribution so that it fits to the sum of the third and fourth sub-distributions (i.e. so that it fits the channel-specific second sum sub-distribution);

computing, for each channel, a distribution in time after an arbitrary preceding pulse of trigger pulses wrongly assigned to a multiplicity category lower than the multiplicity category under consideration due to lost pulses within the gates triggered by them based upon a difference of the scaled second sub-distribution and the sum of the first and second sub-distributions; and summing over all channels and integrating over time the distribution in time after an arbitrary preceding pulse of trigger pulses wrongly assigned to a multiplicity category lower than the multiplicity category under consideration due to lost pulses within the gates triggered by them withdrawing from the summed and integrated distribution the corresponding summed and integrated distribution of the next higher multiplicity category.

Those skilled in the art will appreciate that the methods discussed herein may be implemented and carried out on a computer. Aspects of the present invention are therefore a computer program comprising program instructions for causing a computer to perform any of the methods disclosed herein and a carrier (such as, e.g. a record medium, a computer memory, a read-only memory, an electrical carrier signal, etc.) having therein or thereon computer executable instructions for causing a computer to perform any of the methods disclosed herein. Another aspect of the present invention is a neutron multiplicity detector configured (e.g. by a suitable computer program) to perform the method as disclosed herein. As will be appreciated, a measurement instrument having the present method implemented therein, such that the instrument does the correction by itself, may greatly facilitate the measurement and evaluation procedures.

BRIEF DESCRIPTION OF THE DRAWINGS

A preferred embodiment of the invention will now be described, by way of example, with reference to the accompanying drawings in which.

DETAILED DESCRIPTION

Example of an Experimental Setup

Figure 1:
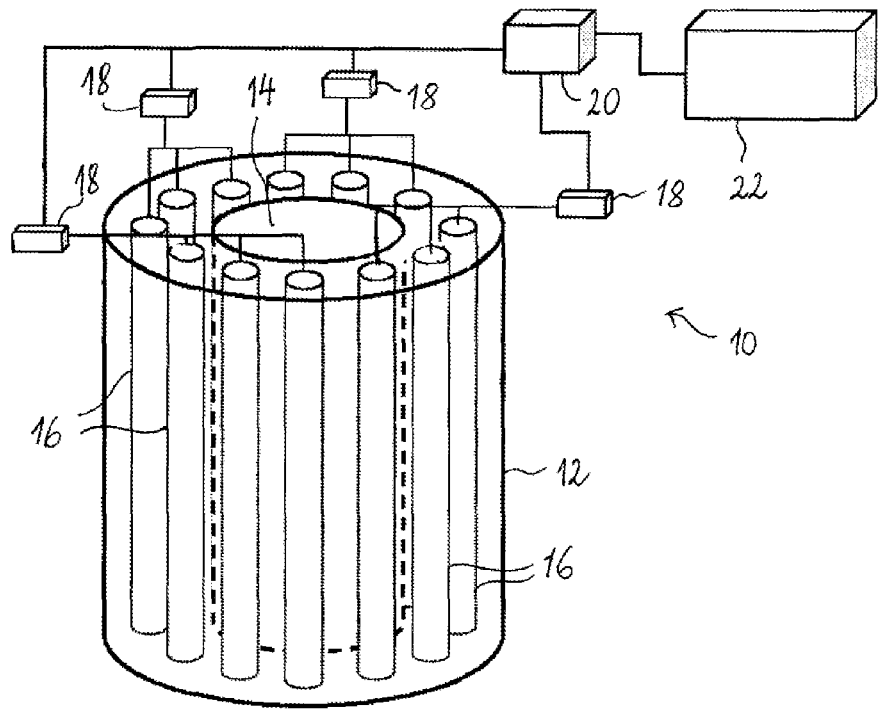
FIG. 1 is a schematic view of a conventional neutron detector.

The neutron multiplicity counter 10 shown in FIG. 1 comprises a big tube of polyethylene 12 with a middle cavity 14, into which the sample (not shown) is arranged for measurement. Gas proportional counters 16, often $^3$He tubes, are disposed in smaller cavities in the polyethylene 12 around the middle cavity 14. If a neutron is emitted from the sample, there is a high probability that it collides with a hydrogen atom in the polyethylene (which serves as moderator). Through collisions with the hydrogen atoms, the fission neutrons thus lose energy until they reach thermal equilibrium with the material. Then they diffuse around the polyethylene until they are lost or captured. During this process of collisions with other atoms, the neutrons lose their information about their origin and original direction. A fraction of the thermalised neutrons eventually hits an atom of the gas contained in the counters 16. Due to the random path of each neutron in the polyethylene moderator 12, the counter tube 16 that finally detects the neutron is also random, although the probability of receiving a neutron is not equally distributed among the counter tubes.

Figure 2:
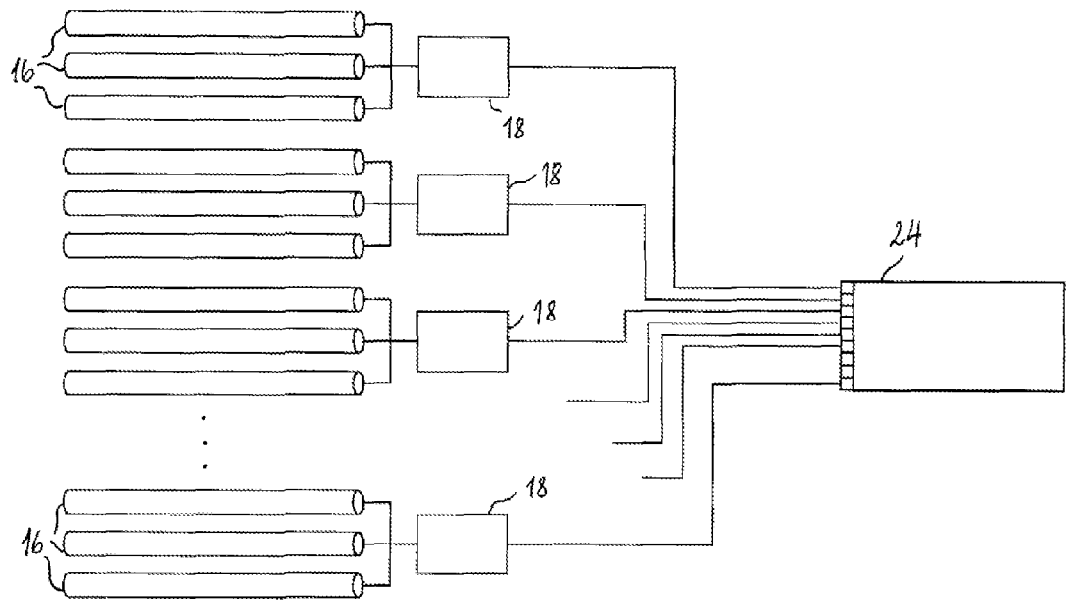
FIG. 2 is a schematic view of the electronic chain from the gas proportional counters to a multi-channel list mode counter.

If a neutron hits an atom in the gas, a charge is released and collected at the electrodes of the counter tube 16. The preamplifier 18 connected to the electrodes receives a pulse, processes it and sends out a digital pulse. These pulses may be combined in an adder 20 by logical OR-operation onto a single line and sent to a multiplicity counter 22 for further analysis. Modern instruments, however, offer the possibility of recording the pulse train from each preamplifier or each group of preamplifiers on a separate channel, as shown in FIG. 2. The pulse trains on these channels are time-synchronized and may be input to a multi-channel list mode counter 24 and a computer for further analysis.

After detection of a neutron, the detecting $^3$He tube needs some time to recover (usually about a microsecond), during which no further pulse can be received from this tube, even if another neutron is captured within this tube. The electronics of the preamplifier also need some time to recover after treating a pulse from a $^3$He tube. The combination of these effects is the above-mentioned "dead time effect", which lead to loss of pulses in a certain time ("dead time") window after each detected pulse.

Figure 3:
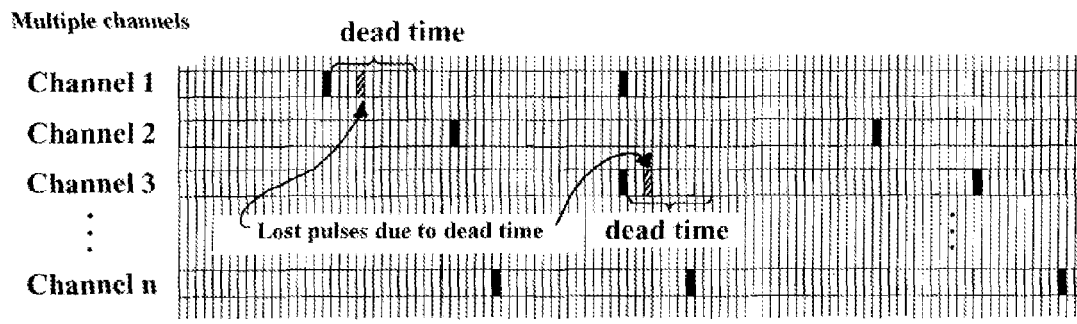
FIG. 3 is an illustration of the way dead time assigns the pulse train from a neutron detector.
Figure 3:
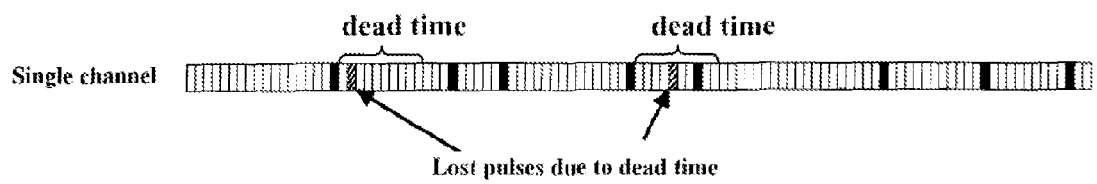

As illustrated in FIG. 3, only pulses coming from the same preamplifier may be subject to dead time loss within the dead time. Hence, for a pulse train obtained from more than one preamplifier, there may well be pulses recorded shortly after another pulse if the pulses came from different preamplifiers. However, if the pulse train is in fact provided on a set of separate channels, one will note that after each pulse, there is a short time during which there is no subsequent pulse on the same channel.

In the practical experiments made to test and validate the method according to the present invention, an Epithermal Neutron Multiplicity Counter (ENMC) from Los Alamos was used for practical experiments (for reference, see e.g. "The Epithermal Neutron Multiplicity Counter Design and Performance Manual: More Rapid Plutonium and Uranium Inventory Verifications by Factors of 5-20", by Steward et al., LA-13743-M, 2000). This multiplicity counter uses 10-atm $^3$He tubes and has an efficiency of 65% and a 22-µs die-away time. The effective dead time of this ENMC is of the order of 40 ns. If the total counting rate is 1 MHz, then the dead-time effect on the Singles is around 4%, on the Doubles 16% and higher on the higher moments.

Figure 4:
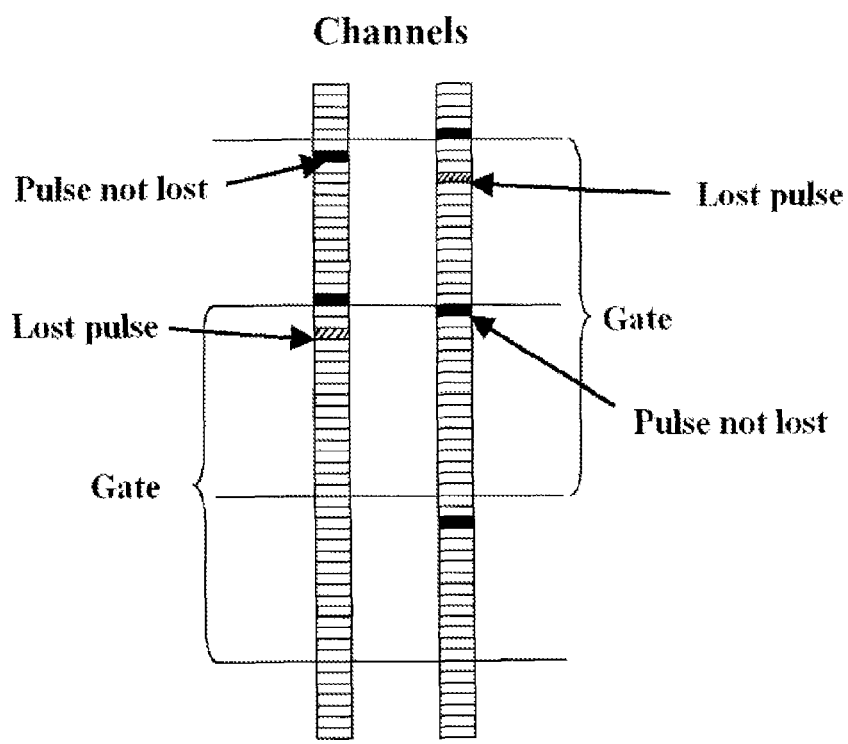
FIG. 4 is an illustration of the way dead time affects the number of pulses in a gate.

To estimate the total number of pulses lost due to dead time (pulses lost for other reasons will not be considered hereinafter), one may compare the different channels of the multi channel list mode counter to each other and make use of the fact that the distribution of pulses among the channels is random (although not uniform). For sake of simplicity, we will explain the principle with respect to a neutron detector with two channels (see FIG. 4).

Assume the two channels are wired to two different preamplifiers, both having the same average count rate. A pulse received shortly after another pulse (which is the "trigger pulse") cannot be received in the trigger channel (the channel on which the trigger pulse was detected) due to dead time but a pulse on the other channel can be received. Hence, if one triggers at one channel, but counts on the other channel one should not see any dead time effect. However, the count rate will be about half of the overall count rate. Alternatively, if one triggers on one channel and counts exclusively on the same channel, one can see a neat dead time effect. Again the count rate will be roughly half of the overall count rate. Neglecting second order effects, one can thus assume that shortly after a trigger pulse, there should have been as many pulses on the trigger channel as on the other channel.

Rossi-α Distributions

A Rossi-α distribution is a distribution in time of events that follow after an arbitrary starting event. A Rossi-α distribution may be obtained by starting a clock at t=0 with the arrival of an arbitrary pulse. The clock continues to run, and each subsequent pulse is recorded in a bin corresponding to its arrival time (i.e. the TIC during which the subsequent pulse has been detected). After a certain time interval (usually several times the lifetime of a neutron in the detector) the clock is stopped. Then the process is iterated with the pulses following the first starting pulse. As the iteration goes on, each bin is "populated" with pulses detected at the corresponding distance from a starting pulse. Each bin is in fact a counter, which is being incremented each time a pulse is detected at the corresponding distance from a starting pulse. In this approach, the time-intervals during which subsequent pulses are stored in bins partially overlap. This is in contrast to the classical Rossi-α distribution recording, where the process is restarted with the next pulse after the end of the counting interval. This distribution, originally used for reactor noise analysis, is flat for a purely random source; if correlated events are present, the Rossi-a distribution follows a curve that may be described by equation 1.

One may split the Rossi-α distribution "RoAl" into subdistributions, which can be recorded separately. For instance, if the pulse train corresponds to the superposition of at least two channels, one may distinguish between pulses following a preceding pulse on the same channel and pulses following a preceding pulse on a different channel. One may thus build a first Rossi-α distribution ("RoAl$_{same}$") indicating the number of pulses following an arbitrary starting pulse on the channel of the starting pulse as a function of the distance from the starting pulse and a second Rossi-α distribution ("RoAl$_{other}$") indicating the number of pulses following an arbitrary starting pulse on any channel except the channel of the starting pulse as a function of the distance from the starting pulse. RoAl$_{same}$ may be obtained by starting a clock at t=0 with the arrival of an arbitrary pulse, recording each subsequent pulse on the same channel as the starting pulse in a bin corresponding to its TIC of arrival and repeating this for all pulses of the pulse sequence. RoAl$_{other}$ may be obtained in parallel by starting a clock at t=0 with the arrival of an arbitrary pulse, recording each subsequent pulse on any channel except the channel of the starting pulse in a bin corresponding to its arrival time and repeating this for all pulses of the pulse sequence. Of course, the sum of ROAl$_{same}$ and RoAl$_{other}$ yield the overall Rossi-Alpha distribution RoAl. Whereas for RoAl one sees a slight drop off in counts towards the beginning of the recording interval (a few TICs after the starting pulse), one does not see this effect for RoAl$_{other}$. This reflects the fact that RoAl$_{other}$ is not affected by detector dead time after the starting pulse.

Figure 5:
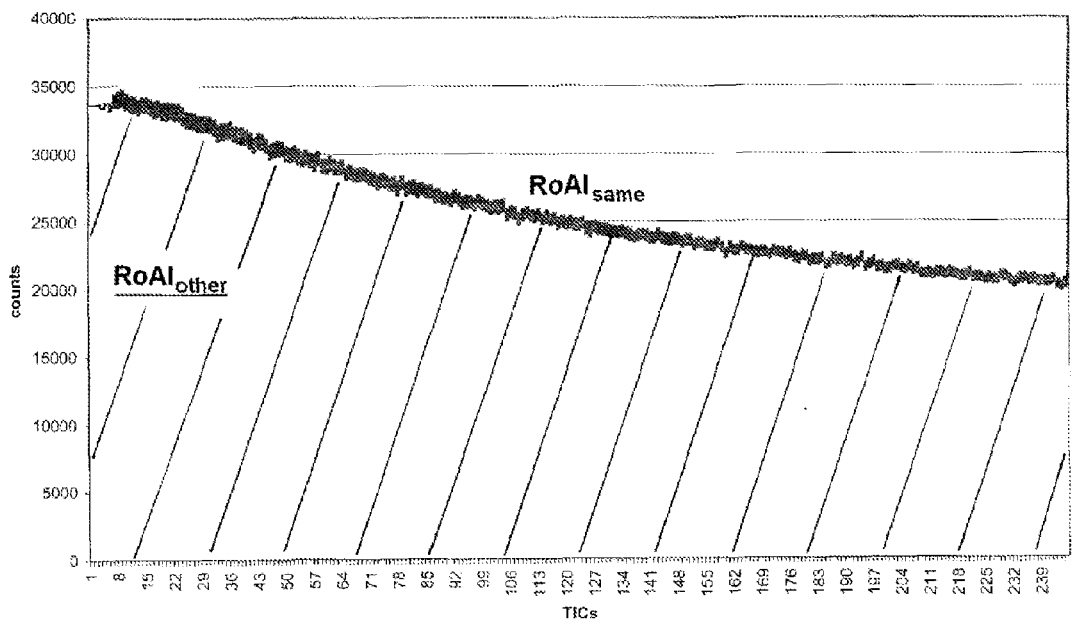
FIG. 5 shows the Rossi-α distributions $RoAl_{same}$ and $RoAl_{other}$ measured for a Cf source ($6.14 \times 10^4$ neutrons/s emission rate)

FIG. 5 shows RoAl$_{other}$ (hatched area) and RoAl$_{same}$ (dark area on top of the hatched area) measured for a Cf source ($6.14 \times 10^4$ neutrons/s emission rate) with the ENMC from Los Alamos, which has 27 channels for counting. RoAl$_{same}$ has been drawn on top of ROAl$_{other}$, so that the overall Rossi-α distribution (RoAl=RoAl$_{same}$+RoAl$_{other}$) is visualised. One can clearly see that RoAl$_{same}$ vanishes near the starting pulse but RoAl$_{other}$ exhibits no dead time effect.

However, the Rossi-α distribution without lost pulses due to dead time is not directly represented by ROAl$_{other}$, because the counts of RoAl$_{other}$ are lower than those of RoAl. To give an estimation of the Rossi-α distribution without lost pulses due to dead time ("RoAl$_{no-dead}$"), RoAl$_{other}$ is scaled to the count rate of RoAl. In order to account for different count rates at the different channels, this is best done channel by channel:

$$RoAl_{no-dead,i} = \frac{RoAl_{other,i}}{totals - totals_i} \cdot totals \qquad (Eqn. 2)$$

where
totals$_i$ is the total number of pulses in preamplifier channel i;
totals is the total number of pulses: totals=$\Sigma_{totals_i}$;
ROAl$_{other,i}$ is the Rossi-α distribution of pulses arrived on channels other than channel i after a starting pulse on channel i;
RoAl$_{no-dead,i}$ is the Rossi-α distribution of pulses arrived on channels other than channel i after a starting pulse on channel i, scaled to the overall count rate.

Therefore the estimated the Rossi-α distribution without lost pulses due to dead time may be calculated by:

$$RoAl_{no-dead} = \sum_i RoAl_{no-dead,i} \qquad (Eqn. 3)$$

The distribution of lost pulses as a function of distance from an arbitrary starting pulse may thus be computed by:

$$D_{lost} = RoAl_{no-dead} - RoAl \qquad (Eqn. 4)$$

Figure 6:
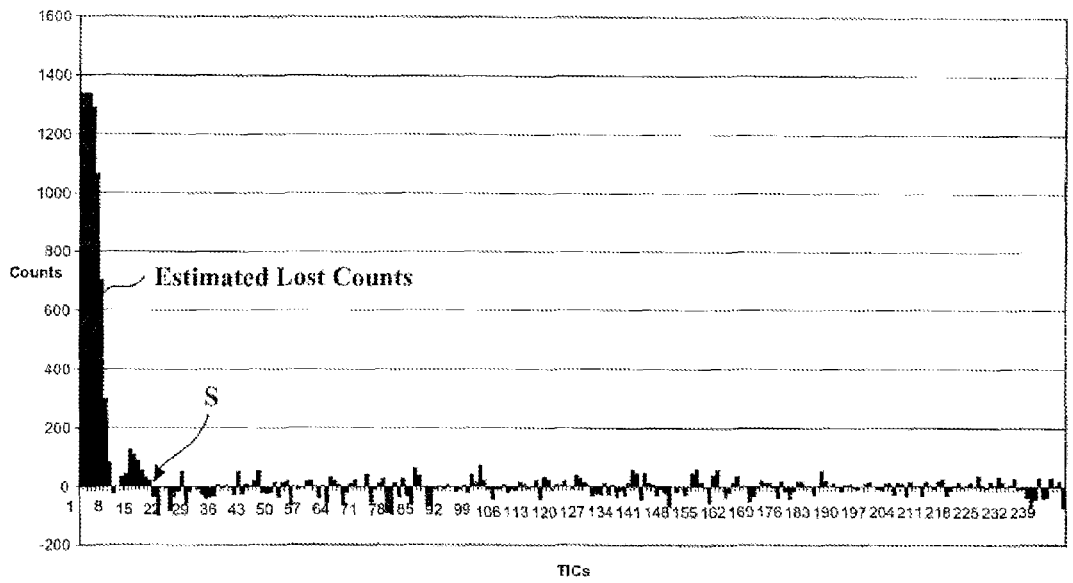
FIG. 6 shows the estimated distribution of lost pulses based upon the Rossi-a distributions of FIG. 5.

FIG. 6 shows this distribution for the Rossi-α distributions of FIG. 5.

If one is interested in the total number ("CL") of pulses lost due to dead time after the starting pulse, one can sum up the counts of D$_{lost}$ in the first few TICs until sure the point where D$_{lost}$ is statistically zero (in FIG. 6, this point is reached about 20 TICs after the starting pulse), i.e. integrate D$_{lost}$ over this time interval. In the following, this point will be called "S". To achieve a good estimate of the total number of pulses lost due to dead time, the interval over which the Rossi-α distributions are recorded has to be sufficiently long, so that it covers the whole dead time. Thus, in practice, a good option would be to make this interval as long as the usual a pre-delay, e.g. 4.5 µs.

It should be noted that every lost pulse appears (statistically) just one time in the distribution of lost pulses D$_{lost}$. There are two reasons for this: 1) A lost pulse is lost because it is in the dead-time shadow of a detected pulse, which eventually becomes a starting pulse during the recording of the Rossi-α distribution—and every detected pulse becomes the starting pulse exactly one time. 2) Although pulses may appear multiple times in the Rossi-α distributions (also in ROAl$_{same}$) because they may lie within the recording windows of several starting pulses, lost pulses are lost only once: as a channel cannot receive any pulse until it has sufficiently recovered from previous dead-time, a lost pulse may not appear as lost within dead-time in more than one recording window of a previous pulse on the same channel.

Multiplicity Vector Corrections

One may think of the neutron counting method according to the invention as a way to distribute the lost pulses to the different components of a multiplicity vector (hereinafter referred to as $\overrightarrow{MD}=(MD_0, MD_1, \ldots)=(MD_m)_{m=0,1,\ldots}$, where the index m represents the multiplicity category). We recall that a multiplicity vector indicates, for each multiplicity category, how many trigger pulses are assigned to this multiplicity category. This task splits in two parts: The correction for lost triggers (expressed as lost trigger vector: $\overrightarrow{LT}=(LT_0, LT_1, \ldots)=(LT_m)_{m=0,1,\ldots}$) and the correction for "upgrading" (expressed as $\overrightarrow{UG}=(UGhd\ 0, UG_1, \ldots)=(UG_m)_{m=0,1,\ldots}$) the multiplicity distribution itself. Whereas $LT_m$ means the change in multiplicity category m that would result if the lost pulses had served as trigger pulses, $UG_m$ means the change in multiplicity category m that would result if the lost pulses were accounted for in gates triggered by other pulses.

Correction for Lost Triggers

The number of lost trigger pulses corresponds exactly to the total number of pulses lost since every lost pulse would eventually have been a trigger pulse in the computation of the multiplicity vector $\overrightarrow{MD}$ if it had not been lost. Hence the correction for lost trigger pulses increases the sum over all multiplicity categories of trigger pulses assigned to the different multiplicity categories by an amount equal to the total number of lost pulses CL. The remaining question is how the lost triggers are distributed within the different components of the multiplicity vector $\overrightarrow{MD}$ (i.e. among the different multiplicity categories).

Since multiple neutrons arising from the same fission event come in bursts, the second, third, etc. neutron of such a burst is more likely subject to loss due to dead time than single emitted neutrons. To be precise, the probability of a neutron to be lost due to dead time depends only on the number and the distance to its predecessors. Hence there is a clear correlation between the components MD$_m$ of the multiplicity vector $\overrightarrow{MD}$, to which lost trigger pulses would contribute (if there were a way to record them) and the distance to their predecessors.

However, once a trigger is lost one cannot determine to which multiplicity category (vector element) this trigger would have contributed in $\vec{MD}$. But one can determine the multiplicity categories $MD_m$ to which actually recorded pulses contribute as trigger pulses, and analyse the distribution among the different multiplicity categories with respect to the distances to the predecessors. Basically, it is assumed that the actually recorded pulses behave in the same way as the pulses lost due to dead time.

The $\vec{MD}$ vector is determined by setting each pulse of the pulse sequence as a trigger pulse triggering the R+A gate, determining the multiplicity of pulses within this gate, and assigning this trigger pulse to the multiplicity category corresponding to the multiplicity of pulses within the gate by incrementing the appropriate vector component $MD_m$ by 1. Initialising the $\vec{MD}$ vector as the null vector (0,0, . . . ) and going through the above steps for all pulses of the sequence, each multiplicity vector component $MD_m$ will finally contain the number of trigger pulses assigned to the corresponding multiplicity category m.

In parallel to building the multiplicity vector $\vec{MD}$, one progressively (iteratively) populates a multi-dimensional data array $(RoAl_{j,i,t,m})_{j,i,t,m}$, which represents a set of Rossi-α distributions subdivided according to several criteria. For a given pulse set as the trigger pulse, one determines trigger-to-predecessor intervals (distances in units of TICs) from that trigger pulse to pulses preceding it within a range longer than the dead time of said neutron detector.

In "$RoAl_{j,i,t,m}$", the indices j, i, t and m have the following meaning:
  j=0 if the preceding pulse occurred on the same channel as the trigger pulse under consideration, j=1 otherwise;
  i represents the channel number of the trigger pulse;
  t represents the trigger-to-predecessor interval (in TICs) from the trigger pulse under consideration to the preceding pulse;
  m respresents the multiplicity category of the trigger pulse.

For each trigger-to-predecessor interval determined (i.e. for each pair of a trigger pulse and a preceding pulse) array element $RoAl_{j1,i1,t1,m1}$ is incremented (by one unit) if (and only if):
  the multiplicity of the trigger pulse under consideration equals m1, and
  the trigger-to-predecessor distance determined equals t1, and
  the trigger pulse was received on channel i1, and
  the preceding pulse was received on the same channel as the trigger pulse (if j1=0) or the preceding pulse was received on a different channel than the trigger pulse (if j1=1).

Figure 7:
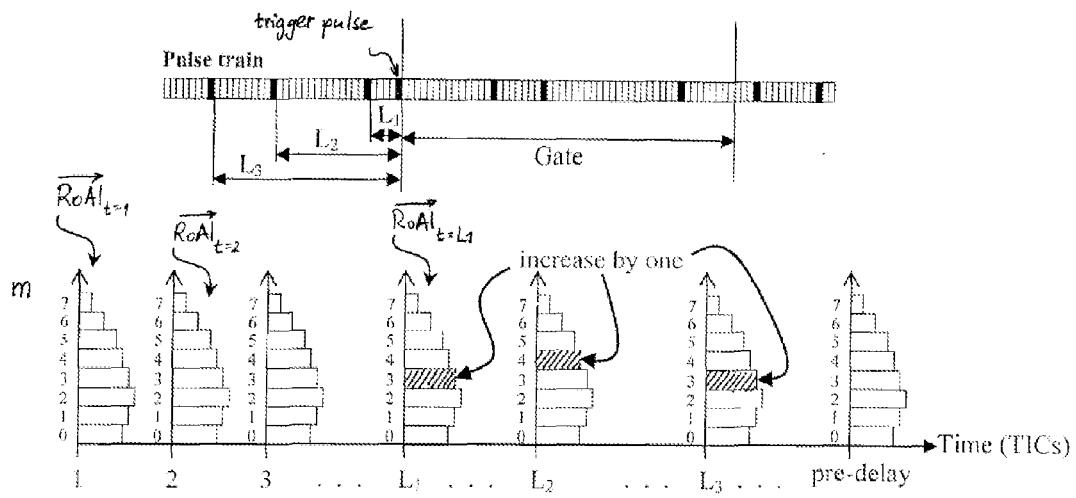
FIG. 7 is an illustration for the computation of the numbers of trigger pulses both assigned to a specific multiplicity category and lying at a specific trigger-to-neighbour distance from a preceding pulse.

Registering pulses in the $RoAl_{j,i,t,m}$ is illustrated in FIG. 7, in which, however, indices j and i have been omitted in order to keep the illustration simple. Time index t is runs along the horizontal axis, while multiplicity index m increases from the bottom to the top along the vertical axis. Time index t runs from 1 to $t_{max}$ where $t_{max}$ is chosen greater than the dead-time-affected time interval. In the figures, $t_{max}$ is chosen equal to the classical pre-delay.

As those skilled will appreciate, the vectors $(ROAl_{j1,i1,t,m})_{t=1,2,...,tmax}$ represent sub-distributions of the above-discussed Rossi-α distribution, where the sub-division has been made according to channel number, multiplicity and whether the trigger pulses and the respective preceding pulses have been received on the same channel or not. In other words, the vector $(RoAl_{j=0,i1,t,m1})_{t=1,2,...,tmax}$ corresponds to the distribution in time after an arbitrary preceding pulse on channel i1 of trigger pulses, received also on channel i1 and assigned to multiplicity category m1. Likewise, $(RoAl_{j=1,i1,t,m1})_{t=1,2,...,tmax}$ corresponds to the distribution in time after an arbitrary preceding pulse, received on any channel except channel i1, of trigger pulses, received on channel i1 and assigned to multiplicity category m1.

In analogy to what has been discussed in the section concerning Rossi-α distributions, the distributions in time $(ROAl_{j=0,i1,t,m1})_{t=1,2,...,tmax}$ and $(RoAl_{j=1,i1,t,m1})_{t=1,2,...,tmax}$ may be used to estimate the number of trigger pulses that were lost in multiplicity category m1 due to neutron detector dead time. This is explained in the following.

For each triple (i, t, m) one computes the sum of $RoAl_{0,i,t,m}$ and $RoAl_{1,i,t,m}$:

$$RoAl_{.,i,t,m} = \sum_{j=0}^{1} RoAl_{j,i,t,m} \quad \text{(Eqn. 5)}$$

A scaled distribution is computed in analogy to equation 2:

$$RoAl_{i,t,m}^{no-dead} = \frac{RoAl_{1,i,t,m}}{\text{Totals} - \text{Totals}_i} * \text{Totals} \quad \text{(Eqn. 6)}$$

In the next step, a distribution in time of the lost trigger pulses on each channel i and in each multiplicity category based upon the "sum distribution" and the scaled distribution:

$$RoAl_{i,t,m}^{lost-counts} = \quad \text{(Eqn. 7)}$$

$$RoAl_{i,t,m}^{no-dead} - RoAl_{.,i,t,m} = RoAl_{i,t,m}^{no-dead} - \sum_{j=0}^{1} RoAl_{j,i,t,m}$$

Summing these results over all channels i and integrating over time (i.e. summing over t), one obtains the distribution of the lost trigger pulses among the different multiplicity categories:

$$LT_m = \sum_{i=1}^{MaxChan} \sum_{t=1}^{S} RoAl_{i,t,m}^{lost-counts} \quad \text{(Eqn. 8)}$$

Figure 8:
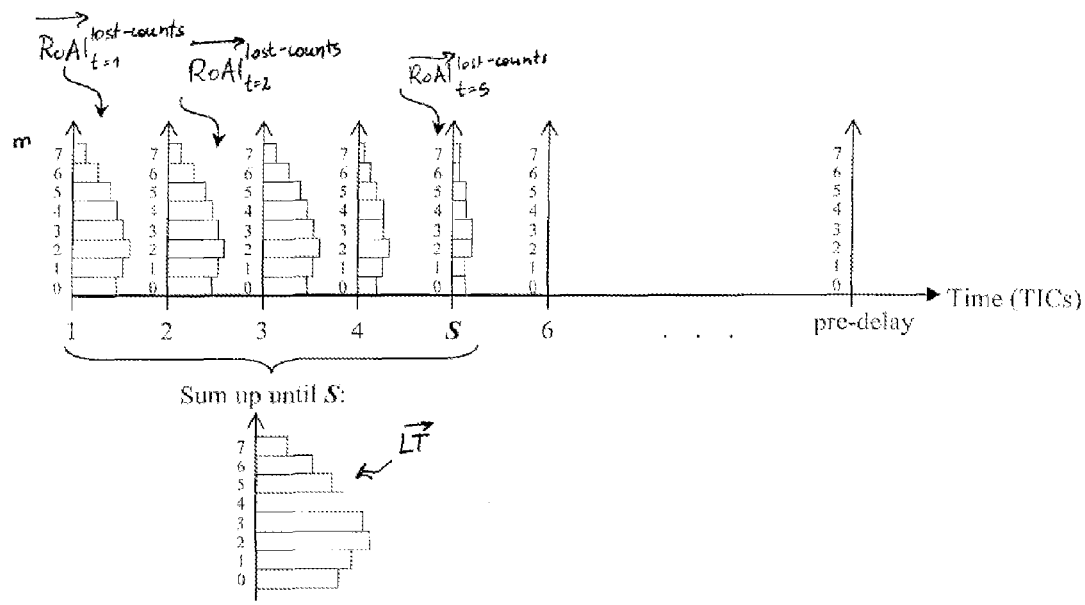
FIG. 8 is an illustration for the computation of the "lost trigger vector" indicating the total number of lost trigger pulses for each multiplicity category.

Integration over time may be stopped at time point S, above which the distribution of lost trigger pulses is statistically zero for each channel. Conducting the integration further has no significant impact on the number of lost trigger pulses in each multiplicity category. Integration over time is illustrated in FIG. 8. To ensure consistency with FIG. 7, the channel index i has again been omitted.

Correction for Upgrading the Multiplicity Vector

Figure 9:
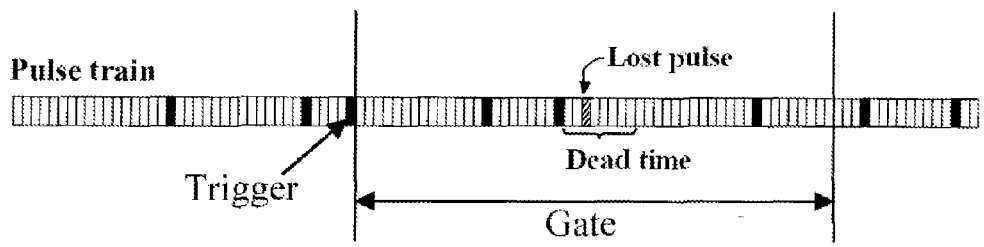
FIG. 9 is an illustration explaining why a trigger pulse is assigned to a wrong lower multiplicity category due to a lost pulse within the gate triggered by it.

Just to recall, "upgrading" herein means the correction for lost pulses, which would have appeared in gates triggered by other pulses. "Upgrading" the multiplicity distribution does not increase the total number of pulse. In fact, the total number of pulses remains the same, since every pulse has already been accounted for, just as contributing to an incorrect multiplicity category. In FIG. 9 the gate triggered by the trigger pulse contains 3 pulses causing the trigger pulse to be assigned to multiplicity category "3". If the lost pulse had been present, the trigger would have been assigned to multiplicity category "4" instead of "3". The number of trigger pulses in multiplicity category "4" would in this case have to be increased by 1 and the number of trigger pulses in multiplicity category "3" would have to be decreased by 1, without a change in the total number of trigger pulses.

In parallel to building the multiplicity vector $\overrightarrow{MD}$ and the multidimensional array $RoAl_{j,i,t,m}$, one progressively (iteratively) populates a further multi-dimensional data array $(^{UG}RoAl_{j,i,t,m})_{j,i,t,m}$, which represents a set of Rossi-α-like distributions subdivided according to several criteria. For each multiplicity category, one records a distribution in time after an arbitrary preceding pulse of pulses situated in any gate triggered by a trigger pulse assigned to the corresponding multiplicity category. Array $(^{UG}RoAl_{j,i,t,m})_{j,i,t,m}$ is initialised as a null array (0,0, ... ). For each pulse, when set as the trigger pulse of a gate, one notes the pulses within that gate and determines the pulse-to-predecessor distances from each of these "in-gate" pulses to pulses preceding them within a certain maximum range.

For each pulse-to-predecessor interval determined (i.e. for each triple of a) a trigger pulse, b) an "in-gate" pulse within the gate triggered by the trigger pulse and c) a preceding pulse of the "in-gate" pulse) array element $^{UG}RoAl_{j2,i2,t2,m2}$ is incremented (by one unit) if (and only if):

the multiplicity of the trigger pulse under consideration equals m2, and the pulse-to-predecessor distance, i.e. the number of TICs from the "in-gate" pulse to the predecessor, equals t2, and the "in-gate" pulse was received on channel i2, and the preceding pulse was received on the same channel as the "in-gate" pulse (if j2=0) or the preceding pulse was received on a different channel than the "in-gate" pulse (if j2=1).

Figure 10:
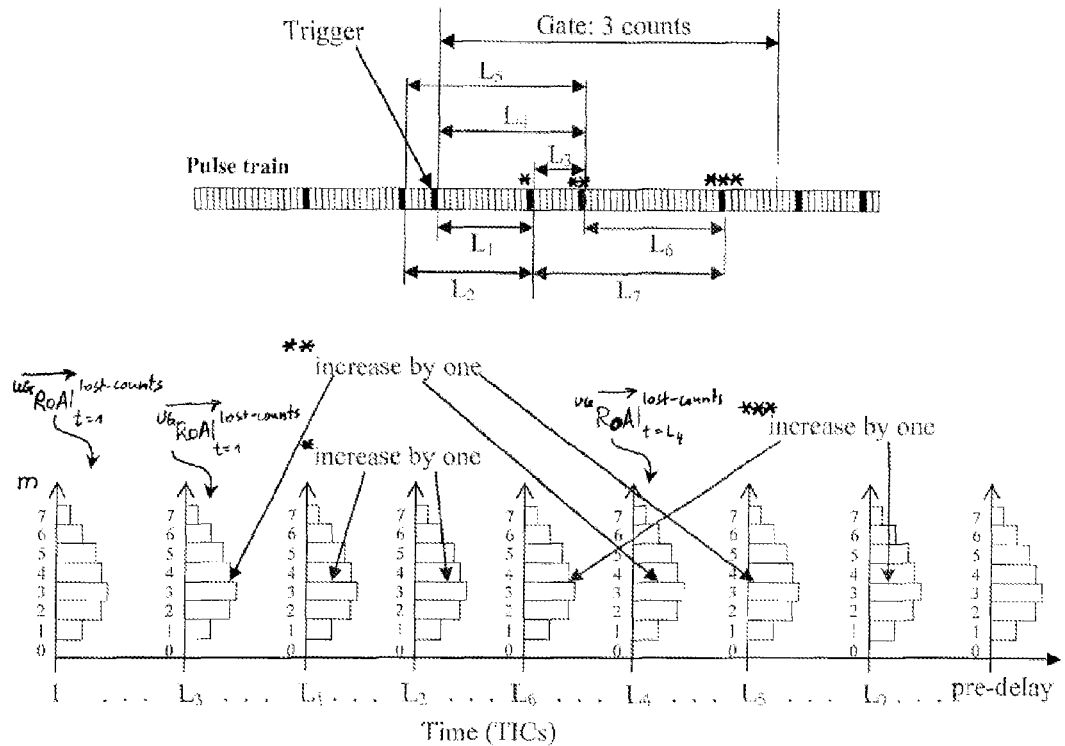
FIG. 10 is an illustration for the computation of the multiplicity-specific distributions in time after an arbitrary preceding pulse of pulses situated in any gate triggered by a trigger pulse assigned to the respective multiplicity category.

Registering pulses in $^{UG}RoAl_{j,i,t,m}$ is illustrated in FIG. 10 (indices j and i have again been omitted). Time index t runs along the horizontal axis, while multiplicity index m runs along the vertical axis. In FIG. 10, as the gate contains three pulses, $^{UG}RoAl_{j2=0,i2,t2,m2=3}$ is incremented by 1 each time a pair of an "in-gate" pulse and a predecessor of that "in-gate" pulse is found where the interval from in-gate" pulse and the predecessor amounts to t2, the in-gate pulse was received on channel i2, and the predecessor was also received on channel i2. Likewise, $^{UG}RoAl_{j2=1,i2,t2,m2=3}$ is incremented by 1 each time a pair of an "in-gate" pulse and a predecessor of that "in-gate" pulse is found where the interval from "in-gate" pulse and the predecessor amounts to t2,the "in-gate" pulse was received on channel i2, and the predecessor was received on any channel but channel i2.

For each triple (i, t, m) one computes the sum of $^{UG}RoAl_{0,i,t,m}$ and $^{UG}RoAl_{1,i,t,m}$:

$$^{UG}RoAl_{.,i,t,m} = \sum_{j=0}^{1} {}^{UG}RoAl_{j,i,t,m} \qquad \text{(Eqn. 9)}$$

A scaled distribution is computed in analogy to equations 2 and 6:

$$^{UG}RoAl_{i,t,m}^{no-dead} = \frac{^{UG}RoAl_{1,i,t,m}}{Totals - Totals_i} * Totals \qquad \text{(Eqn. 10)}$$

In the next step, a distribution in time after an arbitrary preceding pulse of trigger pulses wrongly assigned to a multiplicity category lower than the multiplicity category under consideration due to lost pulses within the gates triggered these trigger pulses is computed based upon the difference between the "sum distribution" and the scaled distribution of equations 9 and 10, respectively:

$$^{UG}RoAl_{i,t,m}^{lost-counts} = {}^{UG}RoAl_{i,t,m}^{no-dead} - {}^{UG}RoAl_{.,i,t,m} = \qquad \text{(Eqn. 11)}$$

$$^{UG}RoAl_{i,t,m}^{no-dead} - \sum_{j=0}^{1} {}^{UG}RoAl_{j,i,t,m}$$

Summing these results over all channels i and integrating over time (i.e. summing over t), one obtains, for each multiplicity category, an estimate of the number of trigger pulses that have been wrongly assigned to a lower multiplicity category:

$$UP_m = \sum_{i=1}^{MaxChan} \sum_{t=1}^{S} {}^{UG}RoAl_{i,t,m}^{lost-counts} \qquad \text{(Eqn. 12)}$$

It should be noted that, by construction, the $UP_0=0$. This is self-evident, since for multiplicity category 0, there is no lower multiplicity category that trigger pulses could have wrongly been assigned to.

One may not simply add $\overrightarrow{UP}=(UP_m)_{m=0.1}, \ldots$ to $\overrightarrow{MD}$, because this would change the total number of trigger pulses (and lost triggers have already been taken account of hereinbefore). We assume now that at most one pulse is lost within a gate due to dead time. Since for normal count-rates the lost pulses represent a few percent of the total number of pulses, the probability of having two or even more pulse lost within a gate due to dead time is small and will be neglected.

Under this assumption, $UP_m$ not only gives an estimate of the number of lost pulses that would have contributed to that multiplicity category if these lost pulses had not actually been lost, but also the number of trigger pulses that for this reason have been accounted for in the next lower multiplicity category. Thus, for each multiplicity category m=0, 1, 2, etc., the net total number of trigger pulses wrongly assigned to that multiplicity category due to lost pulses is given by $UP_m - UP_{m+1}$.

If one defines the vector $UP^{-1shift}$ by $$UP^{-1shift} = UP_{m+1} \text{ for } m=0,1,2,\ldots, \qquad \text{(Eqn. 13)}$$

the multiplicity distribution corrected for lost triggers and "upgraded" may be expressed as:

$$\overrightarrow{MD^{corr}} = \overrightarrow{MD} + \overrightarrow{LT} + \overrightarrow{UP} - \overrightarrow{UP^{-1shift}}. \qquad \text{(Eqn. 14)}$$

where $\overrightarrow{MD^{corr}}$ is the corrected multiplicity vector.

Using $$\overrightarrow{UG} = \overrightarrow{UP} - \overrightarrow{UP^{-1shift}}, \qquad \text{(Eqn. 15)}$$

one finally obtains:

$$\overrightarrow{MD^{corr}} \overrightarrow{MD} + \overrightarrow{LT} + \overrightarrow{UG} \qquad \text{(Eqn. 16)}$$

The method according to the invention may be applied for the correction of an R+A gate multiplicity vector (hereinafter denoted as "$\overrightarrow{RA}$") as well as for the correction of an A gate multiplicity vector (hereinafter denoted $\overrightarrow{A}$, by substituting RA and A for MD, respectively, in the above equations.

In the above example, one builds the distributions in time $(RoAl_{j=0,i1,t,m1})_{t=1,2,\ldots,tmax}$ and $(RoAl_{j=0,i1,t,m1})_{t=1,2,\ldots,tmax}$. One then computes the sum of $RoAl_{0,i,t,m}$ and $RoAl_{1,i,t,m}$ for each triple (i, t, m) according to equation 5. Note that one may alternatively build $(RoAl_{j,i1,t,m1})_{t=1,2,\ldots,tmax}$ and $(RoAl_{j=0 \text{ or } 1,i1,t,m1})_{t=1,2,\ldots,tmax}$. In this case, $(RoAl_{j=0,i1,t,m1})_{t=1,2,\ldots,tmax}$ is built exactly in the same way as explained before. For each pair of a trigger pulse and a preceding pulse, array element $RoAl_{j=0 \text{ or } 1,i1,t1,m1}$ (initialized as 0) is incremented (by one unit) if (and only if):

the multiplicity of the trigger pulse under consideration equals m1, and the trigger-to-predecessor distance determined equals t1, and the trigger pulse was received on channel i1.

One obtains $(RoAl_{j=1,i1,t,m1})_{t=1,2,\ldots,tmax}$ using:

$$RoAl_{j=1,i,t,m} = \hspace{5cm} \text{(Eqn. 5')}$$
$$RoAl_{j=0 \text{ or } 1,i,t,m} - RoAl_{j=0,i,t,m} = \sum_{j=0}^{1} RoAl_{j,i,t,m} - RoAl_{j=0,i,t,m}$$

Similarly, one may build $(^{UG}RoAl_{j=0,i2,t,m2})_{t=1,2,\ldots,tmax}$ and $(^{UG}RoAl_{j=0 \text{ or } 1,i2,t,m2})_{t=1,2,\ldots,tmax}$ instead of $(^{UG}RoAl_{j=0,i2,t,m2})_{t=1,2,\ldots,tmax}$ and $(^{UG}RoAl_{j=1,i2,t,m2})_{t=1,2,\ldots,tmax}$. In this case, $(^{UG}RoAl_{j=0,i2,t,m2})_{t=1,2,\ldots,tmax}$ is built in the same way as explained before. For each triple of a) a trigger pulse, b) an "in-gate" pulse within the gate triggered by the trigger pulse and c) a preceding pulse of the "in-gate" pulse array element $^{UG}RoAl_{j=0 \text{ or } 1,i2,t2,m2}$ (initialized as 0) is incremented (by one unit) if (and only if):

the multiplicity of the trigger pulse under consideration equals m2, and the pulse-to-predecessor distance, i.e. the number of TICs from the "in-gate" pulse to the predecessor, equals t2, and the "in-gate" pulse was received on channel i2.

One obtains $(^{UG}RoAl_{j=1,i1,t,m1})_{t=1,2,\ldots,tmax}$ using:

$$^{UG}RoAl_{j=1,i,t,m} = {^{UG}RoAl_{j=0 \text{ or } 1,i,t,m}} - {^{UG}RoAl_{j=0,i,t,m}} = \hspace{1cm} \text{(Eqn. 9')}$$
$$\sum_{j=0}^{1} {^{UG}RoAl_{j,i,t,m}} - {^{UG}RoAl_{j=0,i,t,m}}$$

It may be computationally more efficient to compute array elements $RoAl_{j=0 \text{ or } 1,i1,t1,m1}$ and $^{UG}RoAl_{j=0 \text{ or } 1,i2,t2,m2}$ than $RoAl_{j=1,i1,t1,m1}$ and $^{UG}RoAl_{j=1,i2,t2,m2}$. Obviously, one could also build $RoAl_{j=0 \text{ or } 1,i1,t1,m1}$ and $RoAl_{j=1,i1,t1,m1}$ to derive $RoAl_{j=0,i1,t1,m1}$, build $^{UG}RoAl_{j=0 \text{ or } 1,i1,t1,m1}$ and $^{UG}RoAl_{j=1,i1,t1,m1}$ to derive $^{UG}RoAl_{j=0,i2,t2,m2}$. The latter is, however, a less preferred alternative.

Numerical Simulation

In real life, the true (i.e. complete) pulse train from a neutron source can never be observed. Hence, to validate the method according to the present invention, the only possibility is to carry out numerical simulations. Modelling the process of neutron emission, capturing and applying dead-time sufficiently close to reality provides a "true", though not observable, pulse train that is not flawed by dead time and the corresponding observable, but dead-time-affected, pulse train. Multiplicity analysis carried out for both of these pulse trains allows comparing how good the correction of the present method performs.

For testing, a pulse train from a multi channel list mode counter was simulated by Monte Carlo simulation using a random number generator. The features of this simulated counter were:

time resolution 1 TIC=100 ns=$10^{-7}$ s;

decays are simulated at random exponentially distributed time intervals;

each decay produces one or several neutrons according to a predefined distribution of the number of neutrons per decay;

it takes 10 TICs until a neutron is thermalised and ready for capture by a $^3$He tube;

each neutron is captured in a $^3$He tube with an exponentially distributed probability;

the time of capture is randomly recorded on one of 32 channels (each channel being in this example equally probable).

With these parameters, one obtains a pulse train (distributed on 32 synchronised channels) of a simulated multi channel counter having an efficiency of 100% (no pulses are lost) and not suffering from dead time. Using this pulse train, the "true" multiplicity vectors for the "reals-plus-accidentals" gate R+A and the "accidentals" gate A can be determined.

A second, dead-time-affected pulse train is produced in the following way:

pulses appearing within 1-5 TICs after a pulse on the same channel are deleted;

pulses appearing 6 TICs after a pulse on the same channel are deleted with a probability of 75%;

pulses appearing 7 TICs after a pulse on the same channel are deleted with a probability of 50%;

pulses appearing 8 TICs after a pulse on the same channel are deleted with a probability of 25%;

all other pulses remain unchanged.

From this pulse train, the dead-time-affected multiplicity distributions $\vec{RA}$ and $\vec{A}$ can be determined once according to the conventional method and once using the correction according to the present invention. This allows assessing the performance of the present method in comparison to the conventional one.

Figure 11:
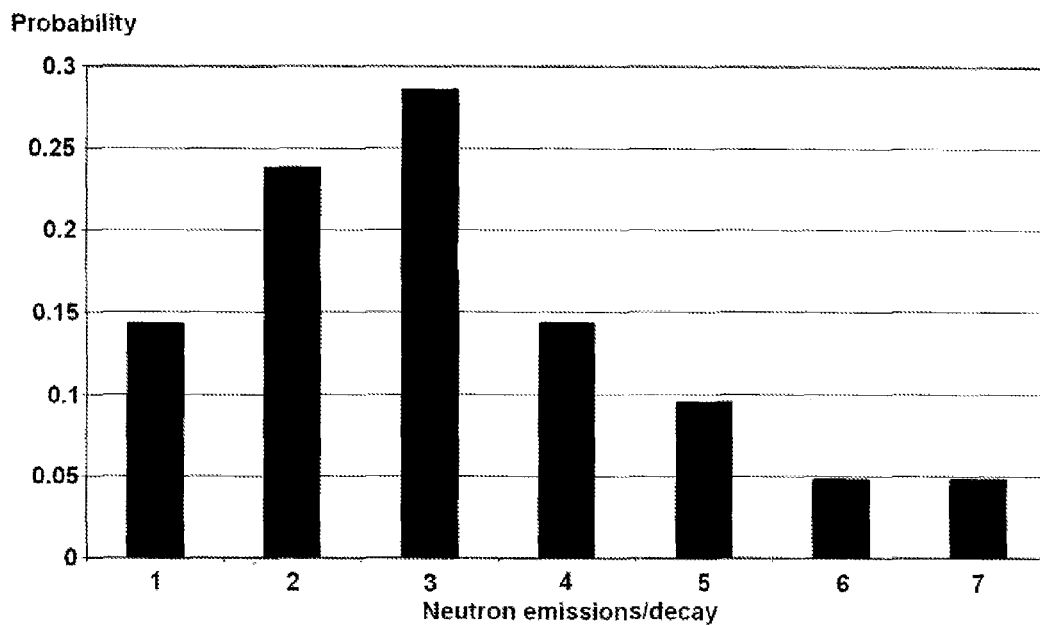
FIG. 11 shows the distribution of neutron emissions per decay used in the simulation to test the present method.

In the following, we will consider a simulation with 27192 neutrons per second, where the distribution of neutron emissions per decay is set as shown in FIG. 11. This means the simulated source undergoes about 8650 spontaneous fissions per second. The recording time was about 100 s, a gate-width of 24.5 μs was used, the neutrons were randomly, equally distributed to 32 channels. There was no "classical pre-delay" between the trigger pulse and the R+A gate (i.e. the R+A gate opens with the TIC following directly behind the TIC containing the trigger pulse).

Table 1 shows the "true" multiplicity vector ($\vec{RA^{tr}}$), the corrected multiplicity vector $\vec{RA^{corr}}$, the difference between the "true" and the corrected multiplicity vector, the uncorrected multiplicity vector $\vec{RA}$, as well as the difference between the "true" and the uncorrected multiplicity vector for the R+A gate. Table 2 shows the same for the A gate. The multiplicity categories are indicated in the first column (n=0, 1, . . . , 23). As one can see, for each multiplicity category, the differences between the "true" and the corrected multiplicity vectors are approximately zero within the expected statistical limits.

TABLE 1

Multiplicity Vectors for the R + A gate

| m | $\overrightarrow{RA^{tr}}$ | $\overrightarrow{RA^{corr}}$ | $\overrightarrow{RA^{tr}} - \overrightarrow{RA^{corr}}$ | $\overrightarrow{RA}$ | $\overrightarrow{RA^{tr}} - \overrightarrow{RA}$ |
|---|---|---|---|---|---|
| 0 | 666888 | 666875.9 | 12.1 | 666893 | −5 |
| 1 | 636375 | 636393 | −18 | 636204 | 171 |
| 2 | 512862 | 512904.2 | −42.2 | 511750 | 1112 |
| 3 | 342718 | 342701.2 | 16.8 | 341219 | 1499 |
| 4 | 230918 | 230807.6 | 110.4 | 228909 | 2009 |
| 5 | 145926 | 145942.6 | −16.6 | 143965 | 1961 |
| 6 | 87484 | 87442.3 | 41.7 | 85332 | 2152 |
| 7 | 42636 | 42633.9 | 2.1 | 41673 | 963 |
| 8 | 24833 | 24809.2 | 23.8 | 24045 | 788 |
| 9 | 13873 | 13870.5 | 2.5 | 13307 | 566 |
| 10 | 7265 | 7241.2 | 23.8 | 6895 | 370 |
| 11 | 3865 | 3874.5 | −9.5 | 3648 | 217 |
| 12 | 1952 | 1965.2 | −13.2 | 1814 | 138 |
| 13 | 915 | 922.7 | −7.7 | 851 | 64 |
| 14 | 469 | 464.4 | 4.6 | 427 | 42 |
| 15 | 250 | 250.7 | −0.7 | 225 | 25 |
| 16 | 129 | 128.4 | 0.6 | 112 | 17 |
| 17 | 59 | 55.7 | 3.3 | 50 | 9 |
| 18 | 36 | 38.9 | −2.9 | 33 | 3 |
| 19 | 21 | 22.2 | −1.2 | 18 | 3 |
| 20 | 8 | 7.4 | 0.6 | 6 | 2 |
| 21 | 1 | 1 | 0 | 1 | 0 |
| 22 | 1 | 1.4 | −0.4 | 1 | 0 |
| 23 | 0 | 0 | 0 | 0 | 0 |

TABLE 2

Multiplicity Vectors for the A gate

| m | $\overrightarrow{A^{tr}}$ | $\overrightarrow{A^{corr}}$ | $\overrightarrow{A^{tr}} - \overrightarrow{A^{corr}}$ | $\overrightarrow{A}$ | $\overrightarrow{A^{tr}} - \overrightarrow{A}$ |
|---|---|---|---|---|---|
| 0 | 2024923 | 2024813 | 109.9 | 2015925 | 8998 |
| 1 | 227255 | 227227.8 | 27.2 | 226931 | 324 |
| 2 | 172530 | 172563.4 | −33.4 | 172482 | 48 |
| 3 | 128931 | 128998.3 | −67.3 | 128448 | 483 |
| 4 | 70956 | 71017.2 | −61.2 | 70656 | 300 |
| 5 | 44089 | 43965.9 | 123.1 | 43498 | 591 |
| 6 | 25289 | 25251.9 | 37.1 | 24875 | 414 |
| 7 | 14587 | 14604.8 | −17.8 | 14061 | 526 |
| 8 | 5241 | 5265.1 | −24.1 | 5117 | 124 |
| 9 | 2859 | 2819.7 | 39.3 | 2715 | 144 |
| 10 | 1419 | 1428.1 | −9.1 | 1366 | 53 |
| 11 | 737 | 719.9 | 17.1 | 682 | 55 |
| 12 | 370 | 393 | −23 | 361 | 9 |
| 13 | 154 | 141.8 | 12.2 | 131 | 23 |
| 14 | 74 | 74.6 | −0.6 | 69 | 5 |
| 15 | 42 | 45.3 | −3.3 | 39 | 3 |
| 16 | 17 | 12.5 | 4.5 | 12 | 5 |
| 17 | 6 | 5 | 1 | 5 | 1 |
| 18 | 6 | 8.6 | −2.6 | 7 | −1 |
| 19 | 3 | 1.7 | 1.3 | 2 | 1 |
| 20 | 3 | 3 | 0 | 3 | 0 |
| 21 | 3 | 2.4 | 0.6 | 2 | 1 |
| 22 | 1 | 1.4 | −0.4 | 1 | 0 |
| 23 | 0 | 0 | 0 | 0 | 0 |

Table 2 show a large difference between the true $\overrightarrow{A^{tr}}$ and the uncorrected multiplicity vector $\overrightarrow{A}$ in multiplicity category "0". This is due to the lost triggers, since in case of randomly selected gates the chance to find 0 pulses therein is high at this count-rate. In contrast, the difference between the true $\overrightarrow{RA^{tr}}$ and the uncorrected $\overrightarrow{RA}$ multiplicity vector of R+A ($\overrightarrow{RA^{tr}} - \overrightarrow{RA}$) is close to 0 in multiplicity category "0". Those skilled in this technical field know that this is always the case if no pre-delay is used. The explanation is that a certain number of gates containing no pulse when subject to dead-time are indeed gates with 1 pulse, which has been lost due to dead time. However, this lost pulse is in the dead time shadow of its trigger and therefore just a few TICs away from it. It would be a trigger itself (if it had not been lost) and because it is so close to the previous trigger the would-be-gate of the lost pulse and the gate of the previous trigger overlap to a large extent. This previous trigger originally showed 0 pulses in its gate, so the chance that the lost pulse had more than 0 pulses in its would-be-gate (which differs only by a few TICs form the previous gate) is extremely small. Hence, during the correction, about the same number of "0"-gates that are lost due to upgrading to "1"-gates need to be regained (and in fact are regained) by lost the trigger correction. It should be noted that the use of a pre-delay in the classical sense would destroy this effect.

Simulation demonstrates that the correction provided for in the proposed method provides good results for low and medium count-rates. However, for high count-rates some assumptions made here do not hold, hence the results will become less precise for high count-rates. If the count rate increases, the pulse losses due to dead-time will increase in number, since the probability that pulses will arrive on the same channel grows. It should also be noted that the gate-length may have an impact on the accuracy of the corrections: although the gate length does not influence the amount of pulses lost, the number of pulses lost inside a gate will grow as the gate length increases. Hence especially the assumption that at most one pulse is lost in a gate will no longer hold and a more elaborate correction for trigger pulses assigned to the wrong multiplicity category may be necessary.

Variants

Those skilled will appreciate that it may be unnecessary, under certain conditions, to subdivide the distribution arrays ($RoAl_{j,i,t,m}$) and ($^{UG}RoAl_{j,i,t,m}$) according to the channels. In this case, one has distribution arrays ($RoAl_{j,t,m}$) and ($^{UG}RoAl_{j,t,m}$). The scaled distributions (in analogy to equations 6 and 10) may then be calculated by $$RoAl_{t,m}^{no-dead} = BlowUp \cdot RoAl_{1,t,m} \qquad (\text{Eqn. 17})$$

and $$^{UG}RoAl_{t,m}^{no-dead} = BlowUp \cdot {}^{UG}RoAl_{1,t,m} \qquad (\text{Eqn. 18})$$

where the "blow-up" factor is defined as:

$$BlowUp = \frac{1}{\sum_{i=1}^{MaxChan} Totals_i \cdot (Totals - Totals_i)}. \qquad (\text{Eqn. 19})$$

To compute the correction vectors, instead of equations 8 and 12, one uses:

$$LT_m = \sum_{t=1}^{S} RoAl_{t,m}^{lost-counts} \qquad (\text{Eqn. 20})$$

$$UP_m = \sum_{t=1}^{S} RoAl_{t,m}^{lost-counts} \qquad (\text{Eqn. 21})$$

The remainder of the computations remains the same. Distinction between the different channels may be unnecessary in particular if the channels are equally affected by dead time.

According to another variant of the correction method, one may omit storing the information (encoded using index j) whether a pulse has been received on the same channel as its predecessor. In this case, one has the distributions arrays:

(RoAl$_{t,m}$) and ($^{UG}$RoAl$_{t,m}$) if no distinction is made between the channels, or (RoAl$_{i,t,m}$) and ($^{UG}$RoAl$_{i,t,m}$) if that distinction is made.

One may then estimate the distributions not affected by dead time, RoAl$_{t,m}^{no\text{-}dead}$ and $^{UG}$RoAl$_{t,m}^{no\text{-}dead}$ (or RoAl$_{i,t,m}^{no\text{-}dead}$ and $^{UG}$RoAl$_{i,t,m}^{no\text{-}dead}$), by fitting the theoretical Rossi-α distribution (given in equation 1) to the actual distributions where these are not affected by the dead time (i.e. above point S) and extrapolating the theoretical distribution into the dead-time-affected range. Alternative extrapolation functions (e.g. polynomial extrapolation; extrapolation using splines) could be used instead of the Rossi-a distribution.

It should be noted that, in the figures, the gate follows after the trigger pulse. In a practical application, however, it may be the case that the gate precedes the trigger pulse. The method according to the invention may be applied whatever the position of the trigger pulse relative to the gate is.

The invention claimed is:

1. Neutron counting method comprising:
    receiving a pulse sequence from a neutron detector; for each pulse of said pulse sequence: setting said pulse as a trigger pulse triggering a gate, assigning said trigger pulse to a multiplicity category corresponding to the multiplicity of pulses within said gate, determining trigger-to-predecessor intervals from said trigger pulse to pulses preceding said trigger pulse within a range longer than a dead time of said neutron detector;
    for each multiplicity category: determining the number of trigger pulses assigned to said multiplicity category;
    building, based upon the trigger-to-predecessor intervals determined, a distribution in time after an arbitrary preceding pulse of trigger pulses assigned to said multiplicity category;
    estimating, based upon said distribution, a number of trigger pulses lost due to neutron detector dead time that would have been assigned to said multiplicity category; and
    correcting the number of trigger pulses assigned to said multiplicity category by said estimated number of lost trigger pulses.

2. The method according to claim 1, wherein, for each multiplicity category, the number of trigger pulses lost due to neutron detector dead time that would have been assigned to said multiplicity category is estimated based upon a comparison of said built distribution with a conjectured theoretical distribution.

3. The method according to claim 1, wherein said pulse sequence is received on at least two channels, wherein, for each multiplicity category, said building of said distribution in time after an arbitrary preceding pulse of trigger pulses assigned to said multiplicity category comprises:
    building a first sub-distribution, said first sub-distribution being a distribution in time after an arbitrary preceding pulse of trigger pulses assigned to said multiplicity category and received on the same of said at least two channels as said preceding pulse;
    building a second sub-distribution, said second sub-distribution being a distribution in time after an arbitrary preceding pulse of trigger pulses assigned to said multiplicity category received on another of said at least two channels as said preceding pulse; and
    building a first sum sub-distribution, said first sum sub-distribution being a distribution in time after an arbitrary preceding pulse of trigger pulses assigned to said multiplicity category received on any of said at least two channels;
    said second sub-distribution being built by subtracting said first sub-distribution from said first sum sub-distribution or said first sum sub-distribution being build by summing said first and second sub-distributions.

4. The method according to claim 3, wherein, for each multiplicity category, said estimating of said number of trigger pulses lost due to neutron detector dead time that would have been assigned to said multiplicity category comprises:
    scaling said second sub-distribution so that it fits to the first sum sub-distribution;
    computing a distribution in time after an arbitrary preceding pulse of lost trigger pulses based upon a difference of said scaled second sub-distribution and the first sum second sub-distribution; and
    integrating over time said distribution in time after an arbitrary preceding pulse of lost trigger pulses.

5. The method according to claim 1, wherein said pulse sequence is received on at least two channels, wherein, for each multiplicity category, said building of said distribution in time after an arbitrary preceding pulse of trigger pulses assigned to said multiplicity category comprises:
    building, for each channel, a first sub-distribution, said first sub-distribution being a distribution in time after an arbitrary preceding pulse of trigger pulses, received on said channel, assigned to said multiplicity category and received on the same of said at least two channels as said arbitrary preceding pulse;
    building, for each channel, a second sub-distribution, said second sub-distribution being a distribution in time after an arbitrary preceding pulse of trigger pulses, received on said channel, assigned to said multiplicity category and received on another of said at least two channels as said arbitrary preceding pulse; and
    building, for each channel, a first sum sub-distribution, said first sum sub-distribution being a distribution in time after an arbitrary preceding pulse of trigger pulses, received on said channel, assigned to said multiplicity category received on any of said at least two channels, said second sub-distribution being built, for each channel, by subtracting said first sub-distribution from said first sum sub-distribution or said first sum sub-distribution being build, for each channel, by summing said first and second sub-distributions.

6. The method according to claim 5, wherein, for each multiplicity category, said estimating of said number of trigger pulses lost due to neutron detector dead time that would have been assigned to said multiplicity category comprises:
    scaling, for each channel, said second sub-distribution so that it fits to the first sum sub-distribution;
    computing, for each channel, a distribution in time after an arbitrary preceding pulse of lost trigger pulses based upon a difference of said scaled second sub-distribution and the first sum sub-distribution; and
    summing over all channels and integrating over time said distribution in time after an arbitrary preceding pulse of lost trigger pulses.

7. The method according to claim 1, comprising for each pulse of said pulse sequence, when set as trigger pulse, for each pulse within the gate triggered by said trigger pulse:
    determining pulse-to-predecessor intervals from said pulse in the gate to pulses preceding it; and for each multiplicity category: building, based upon said pulse-to-predecessor intervals, a distribution in time after an arbitrary preceding pulse of pulses situated in any gate triggered by a trigger pulse assigned to said multiplicity category;
    estimating, based upon said distribution in time after an arbitrary preceding pulse of pulses situated in any gate triggered by a trigger pulse assigned to said multiplicity category, a number of trigger pulses wrongly assigned to said multiplicity category due to lost pulses within the gates triggered by them; and correcting the number of trigger pulses assigned to said multiplicity category by said estimated number of wrongly assigned trigger pulses.

8. The method according to claim 7, wherein said pulse sequence is received on at least two channels, wherein, for each multiplicity category, said building of said distribution in time after an arbitrary preceding pulse of pulses situated in any gate triggered by a trigger pulse assigned to said multiplicity category comprises:

building a third sub-distribution, said third sub-distribution being a distribution in time after an arbitrary preceding pulse of pulses situated in any gate triggered by a trigger pulse assigned to said multiplicity category and received on the same of said at least two channels as said preceding pulse;

building a fourth sub-distribution, said fourth sub-distribution being a distribution in time after an arbitrary preceding pulse of pulses situated in any gate triggered by a trigger pulse assigned to said multiplicity category and received on another one of said at least two channels as said preceding pulse; and building a second sum sub-distribution, said second sum sub-distribution being a distribution in time after an arbitrary preceding pulse of pulses situated in any gate triggered by a trigger pulse assigned to said multiplicity category and received on any of said at least two channels;

said fourth sub-distribution being built by subtracting said third sub-distribution from said second sum sub-distribution or said second sum sub-distribution being build by summing said third and fourth sub-distributions.

9. The method according to claim 8, wherein, for each multiplicity category, estimating, based upon said distribution in time after an arbitrary preceding pulse of pulses situated in any gate triggered by a trigger pulse assigned to said multiplicity category, a number of trigger pulses wrongly assigned to said multiplicity category due to lost pulses within the gates triggered by them comprises:

scaling said fourth sub-distribution so that it fits to the second sum sub-distribution;

computing a distribution in time after an arbitrary preceding pulse of trigger pulses wrongly assigned to a multiplicity category lower than said multiplicity category due to lost pulses within the gates triggered by them based upon a difference of said scaled second sub-distribution and the second sum sub-distribution; and integrating over time said distribution in time after an arbitrary preceding pulse of trigger pulses wrongly assigned to a multiplicity category lower than said multiplicity category due to lost pulses within the gates triggered by them; and withdrawing from said integrated distribution the corresponding integrated distribution of the next higher multiplicity category.

10. The method according to claim 7, wherein said pulse sequence is received on at least two channels, wherein, for each multiplicity category, said building of said distribution in time after an arbitrary preceding pulse of pulses situated in any gate triggered by a trigger pulse assigned to said multiplicity category comprises:

building, for each channel, a third sub-distribution, said third sub-distribution being a distribution in time after an arbitrary preceding pulse, received on said channel, of pulses situated in any gate triggered by a trigger pulse assigned to said multiplicity category and received on the same of said at least two channels as said preceding pulse;

building, for each channel, a fourth sub-distribution, said fourth sub-distribution being a distribution in time after an arbitrary preceding pulse, received on said channel, of pulses situated in any gate triggered by a trigger pulse assigned to said multiplicity category and received on another one of said at least two channels as said preceding pulse; and building, for each channel, a second sum sub-distribution, said second sum sub-distribution being a distribution in time after an arbitrary preceding pulse, received on said channel, of pulses situated in any gate triggered by a trigger pulse assigned to said multiplicity category and received on any of said at least two channels;

said fourth sub-distribution being built by subtracting said third sub-distribution from said second sum sub-distribution or said second sum sub-distribution being build by summing said third and fourth sub-distributions.

11. The method according to claim 10, wherein, for each multiplicity category, estimating, based upon said distribution in time after an arbitrary preceding pulse of pulses situated in any gate triggered by a trigger pulse assigned to said multiplicity category, a number of trigger pulses wrongly assigned to said multiplicity category due to lost pulses within the gates triggered by them comprises:

scaling, for each channel, said fourth sub-distribution so that it fits to the second sum sub-distribution;

computing, for each channel, a distribution in time after an arbitrary preceding pulse of trigger pulses wrongly assigned to a multiplicity category lower than said multiplicity category due to lost pulses within the gates triggered by them based upon a difference of said scaled second sub-distribution and the second sum sub-distribution; and summing over all channels and integrating over time said distribution in time after an arbitrary preceding pulse of trigger pulses wrongly assigned to a multiplicity category lower than said multiplicity category due to lost pulses within the gates triggered by them withdrawing from said summed and integrated distribution the corresponding summed and integrated distribution of the next higher multiplicity category.

12. Neutron multiplicity detector configured to perform a neutron counting method comprising:

receiving a pulse sequence from a neutron detector; for each pulse of said pulse sequence: setting said pulse as a trigger pulse triggering a gate, assigning said trigger pulse to a multiplicity category corresponding to the multiplicity of pulses within said gate, determining trigger-to-predecessor intervals from said trigger pulse to pulses preceding said trigger pulse within a range longer than a dead time of said neutron detector;

for each multiplicity category: determining the number of trigger pulses assigned to said multiplicity category;

building, based upon the trigger-to-predecessor intervals determined, a distribution in time after an arbitrary preceding pulse of trigger pulses assigned to said multiplicity category;

estimating, based upon said distribution, a number of trigger pulses lost due to neutron detector dead time that would have been assigned to said multiplicity category; and correcting the number of trigger pulses assigned to said multiplicity category by said estimated number of lost trigger pulses.

* * * * *

UNITED STATES PATENT AND TRADEMARK OFFICE
CERTIFICATE OF CORRECTION

| | | |
|---|---|---|
| PATENT NO. | : 8,884,212 B2 | Page 1 of 1 |
| APPLICATION NO. | : 13/394598 | |
| DATED | : November 11, 2014 | |
| INVENTOR(S) | : Holzleitner et al. | |

It is certified that error appears in the above-identified patent and that said Letters Patent is hereby corrected as shown below:

In the Specification

Column 1, line 7, insert

--GOVERNMENT RIGHTS STATEMENT

The United States government has rights in this invention pursuant to Contract No. DE-AC52-06NA25396 between the United States Department of Energy and Los Alamos National Security, LLC for the operation of Los Alamos National Laboratory.--

Signed and Sealed this
Fourteenth Day of April, 2015

Michelle K. Lee
*Director of the United States Patent and Trademark Office*